United States Patent [19]

Alfano et al.

[11] 4,291,282

[45] Sep. 22, 1981

[54] STABILIZED PULSE PRODUCING MODE LOCKED LASER SYSTEM

[75] Inventors: Robert R. Alfano, New York; Bruce H. Green, Forest Hills, both of N.Y.

[73] Assignee: The Research Foundation of the City University of New York, New York, N.Y.

[21] Appl. No.: 73,441

[22] Filed: Sep. 7, 1979

[51] Int. Cl.$^3$ .............................................. H01S 3/13
[52] U.S. Cl. ......................... 331/94.5 S; 331/94.5 ML
[58] Field of Search .................. 331/94.5 ML, 94.5 C, 331/94.5 S, 94.5 Q

[56] References Cited

U.S. PATENT DOCUMENTS 4,019,156  4/1977  Fountain et al. .............. 331/94.5 Q

OTHER PUBLICATIONS

"Simultaneous Q-Switching and Acoustatic Mode Locking of the 1.318 μm Transition in Nd: TAG" by Jones et al., Opt. & Quant. Electronics 7 (1975).
Passive Mode Locking of a Ruby Laser Using a Birefringent Crystal and a Fractional-Commensurate Cavity Length" by Mangla et al., Appl. Phys. Lett. 71, No. 2 (1976).
"Multiline Mode-Locked UV-Preionized $CO_2$ Laser" by Richardson, Appl. Phys. Lett. vol. 25, No. 1, (Jul. 1974).

Primary Examiner—William L. Sikes
Assistant Examiner—León Scott, Jr.
Attorney, Agent, or Firm—Laurence R. Brown

[57] ABSTRACT

A pulse producing mode-locked laser system with only passive lens and filtering elements and low cost Nd:glass laser material, or an equivalent, is stabilized and made to produce reliably output laser pulses of known characteristics and intensity without critical alignment and operating conditions.

This is performed by eliminating response to spurious satellite laser pulses incited when triggering the coherent radiation in the laser materials. Several system components aid in the attainment of the better signal to noise ratio effective in making the laser system produce uniform output pulses from shot to shot, including provision of at least one mirror with a radius of curvature R meeting the criterion $3L>R>L$ where L is the path length through the laser material between two reflecting mirrors, and a dye mode-locking cell increased in path length by two orders of magnitude to the order of 1 cm. Also the mirrors have a wedge-shaped reflection surface at an angle of $\geq 20'$ up to 2° in order to reflect and eliminate spurious satellite pulse energy out of the reinforcement path axis between the mirrors and through the laser material.

This results in 90% reproducibility of output laser pulse characteristics including profile and intensity.

18 Claims, 5 Drawing Figures

STABILIZED PULSE PRODUCING MODE LOCKED LASER SYSTEM

TECHNICAL FIELD

This invention relates to laser systems and more particularly it relates to stabilized laser systems assuring output pulses of reproducible uniform intensity profiles.

BACKGROUND ART

Pulse laser systems at the present stage of the art are well known, but are erratic and unreliable in nature. Systems tend to be critical in alignment and dimensioning and even when well aligned are erratic in producing a reliable and expected level of performance day after day. Thus, in the prior art there have not been available reliable commercial pulse laser systems that reproduce output pulses of similar output intensity profiles from shot to shot in the absence of critical short range calibration and alignment under ideal operating conditions.

It is known in the art that spurious oscillations may be induced in laser systems thereby decreasing reliability and usefulness. Thus, U.S. Pat. No. 3,682,178, E. B. Treacy, Dec. 14, 1971; No. 3,808,554, M. Lax et al., Apr. 30, 1974; and No. 3,715,685, Ed Gordon et al., Feb. 6, 1973 provide modified reflective paths operable with reflecting means to suppress unwanted oscillation modes that interfere with reliability and performance.

Also it is known that spurious secondary and satellite pulses interfere with reliability and performance. Thus, W. D. Fountain et al. in U.S. Pat. No. 4,019,156, Apr. 19, 1977 provides for a combination of active and passive loss modulators within the optical cavity wherein the mode locking function is controlled by an active electro-optical modulator. However this system does not adequately eliminate the generation of unwanted secondary pulses and introduces the complexities of active filters.

It is therefore an object of the present system to improve the reliability of the pulse reproduction of a mode-locked laser system by elimination of satellite pulsing, thereby assuring that the output pulses are of a predetermined intensity profile.

It is a further object of the invention to provide a reliable pulse producing laser system without reliance upon expensive and critical electro-optical active filters, or other expensive lens systems requiring special lenses critical in construction and limited to operation at particular wavelengths.

A general object of the invention is to provide a simplified low cost system that is not critical in operation and that will be reliable in reproducing consistently output pulses of a predetermined intensity profile.

A more specific object of the invention is to make a mode-locked Nd:glass laser system reliable from shot to shot in emitting consistent output pulses of predetermined characteristics.

Another object of the invention is to produce in a similar manner an improved Ruby laser system.

BRIEF DISCLOSURE OF THE INVENTION

A laser pulse system using for example Nd: glass laser material and a "Kodak 9860" saturable dye solution in a mode-locked operation emits $1.06\mu$ wavelength output laser pulses in an envelope of several hundred nano seconds in duration.

The Nd:glass is in the form of a rod cut at Brewster's angle and is inserted in a conventional water cooled laser head for triggering and pumping by a flash lamp.

In accordance with this invention two reflecting mirrors are located on opposite sides of the laser at an optical path length L passing through the laser and the radius of curvature R of at least one mirror satisfies the condition $3L > R > L$.

For further operational stability offsetting encountered thermal and mechanical instabilities encountered in operation, the usual one mm thick dye cell is replaced by one in the order of one cm in optical path length. An aperture in the order of four mm in diameter is disposed between the laser rod and the dye cell. Also the mirror surfaces are wedge shaped $\geq 20'$.

This system is maintained at a constant temperature and the dye cell is replaced after three days of continuous use or is fitted for a dye flow system. Thus, output pulse intensity profiles are reproducible within 90% of each other.

A Ruby laser embodiment is also provided using a DDI in methanol saturable dye solution in a mode-locked operation emitting $0.694\mu$ wavelength laser pulses.

BRIEF DESCRIPTION OF THE DRAWINGS

Further features, objectives and advantages of the invention will be found throughout the following more detailed description of the invention, which refers to the accompanying drawing, wherein.

DETAILED DESCRIPTION OF A PREFERRED EMBODIMENT

Figure 1:
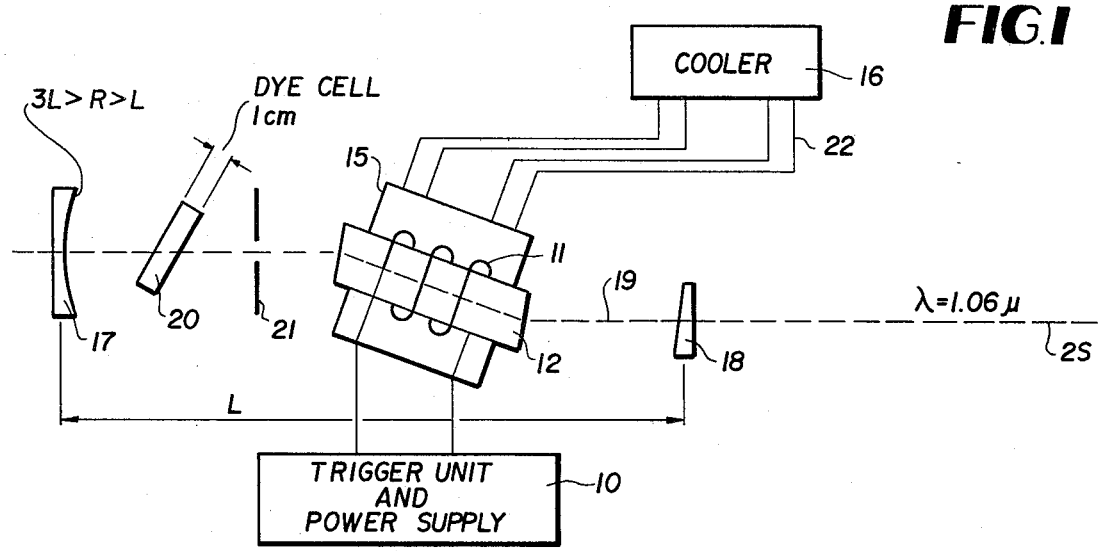
FIG. 1 is a schematic representation of a mode-locked laser pulse system embodying the invention.

Since mode-locked glass laser systems are well known in the art as represented for example by the above-identified prior art and U.S. Pat. No. 3,611,187 issued Oct. 15, 1971, it is known to those skilled in the art how to construct a system and to produce output pulse envelopes of laser induced oscillations. Typically a picosecond laser train is emitted with a wavelength $\lambda$ of the order of $1.06\mu$. Thus, in FIG. 1 the system afforded by this invention is shown schematically.

In a mode-locked laser pulse producing system each shot or pulse is fired from a trigger unit and power supply 10 which typically flashes a flash lamp 11 about a laser rod 12 selectively or periodically at a typical rate of about one to two shots per minute.

Conventional laser mounting heads 15 are available for holding the laser rod 12 which is a rod of about 1.27 cm diameter ($\frac{1}{2}$ inch) of 2 to 3% Nd:glass laser material doped with silicate or phosphate with rod ends polished to $\lambda/10$. Preferably the ends are cut at or near Brewster's angle. The laser mounting head 15 is fitted with a cooling system which circulates from coolor 16 through pipes 22 deionized and filtered water to regulate the temperature of the laser rod 12 at typically 21° C. within one degree for silicate and Ruby laser rods. For phosphate rods a water-ethyl glycol mixture is used.

Two dielectric coated mirrors 17 and 18 are separated by a distance L, typically one meter, over the optical path length 19 passing through the laser rod 12. A mode locking dye cell 20 is interspersed in the pathway 19 and has a saturable dye solution such as "Kodak 9860 or 9740" in a cell oriented near Brewster's angle. An aperture plate 21 located between the laser rod 12 and the dye cell 20 provides an aperture between one to ten mm in diameter, preferably four mm.

The curved mirror 17 has a radius R in a conventional system in the order of 10 meters, and reflects close to 100% of the laser energy ($\lambda = 1.06\mu$). The mirror 18 may be flat with a transmission of laser energy $\lambda = 1.06\mu$ of about 40% to produce output energy along the axis 25.

As aforesaid a laser system of this type has been in the past quite unreliable in providing consistent output pulse intensity profiles from shot to shot and thus the utility of the systems is significantly limited in the scientific community in the study of physics, chemistry and biology. Not only is alignment extremely critical, but changes of ambient conditions from day to day cause material differences in operation. However most unreliability comes from misfiring where outputs from shot to shot are inconsistent and unpredictable.

In accordance with this invention therefore the misfiring and inconsistency is attributed to the appearance of secondary pulse trains known as satellite pulses induced in the laser rod 12 by triggering of lamp 11 thereby providing erratic and unpredictable intensity profiles of output pulses. For example, two separate induced laser oscillation pulses may travel in opposite directions in the laser rod 12 in response to a single triggering of the lamp 11. Since this satellite phenomenon is random in nature most of the satellite pulses are of a minor intensity and a dominant pulse is usually present. Thus, in accordance with this invention the laser system is made more reliable by eliminating the satellite pulses and reinforcing the dominant pulses to thereby produce an output pulse of predetermined intensity profile consistently produced shot after shot.

The two most significant factors in improving the reliability of the system are (1) the radius of curvature R of a reflecting mirror 17 and (2) the thickness increase by two orders of magnitude of the dye cell 20 interposed in the path 19. Other contributory factors, combinational in effect, include the system effectiveness attained by use of the Brewster's angle, stabilized temperature and proper mirror mounts and further reduction of satellite pulse gain by use of wedge-shaped front and rear mirrors 17, 18. Accordingly, this invention provides a new combination of elements coacting in a novel way to provide improved, more efficient and more consistent output pulse profiles and advances the state of the art to make simplified laser mode-locked pulse systems more useful particularly for scientific and calibrated measurement.

Stability is significantly improved by confining the radius of curvature R of the mirror 17 to meet the criterion $3L > R > L$. Thus, for a one meter path length L between mirrors 17 and 18, the radius of curvature R is preferably 1.5 meters and should not exceed 3 meters where stability begins to deteriorate. Apparently this critical curvature change from the prior art has the advantage of confining rays more closely along the axis path 19 and therefore reinforces the desirable oscillation and system gain of the dominant pulses formed at each trigger cycle. Also compensation occurs for thermal distortions in the laser rod thereby to avoid irregularites of performance from this problem. In any event, if the radius is outside the specified range, stability deteriorates.

The dye mode locker cell 20 which operates as a passive absorption filter has its path length increased by two orders of magnitude to the order of 1 cm, thereby serving to further deteriorate the secondary satellite pulses while appropriately passing for reinforcement the primary dominant pulses. The dye is preferably "Kodak 9860" in dichlorethane with transmission at $\lambda = 1.06\mu$ of between 60 to 75%, preferably 70%. This can be used three days of continuous use or can have a dye flow system to increase dye usability time to about two weeks. The optical cell has pyrex or quartz windows with a surface polished better than $4\lambda$.

Furthermore, the mirror reflection surfaces are wedge shaped preferably between 20′ to 2° as illustrated by the shape of mirror 18. This causes a further diffractive deterioration of the satellite pulses at both mirrors preventing reinforcement of the satellite pulses and interference with the dominant pulse which thereby produces a uniform output characteristic with envelope shape of the train and the laser pulse characteristics consistent. The mirrors are held in micrometer adjustable mounts which are attached to metal blocks.

EXAMPLE 1

The combination above described is a preferred embodiment because of simplicity and performance, and has been tested to be free of the usual thermal and mechanical instabilities to produce the same laser pulse characteristics with better than 90% reliability. The output pulse envelope shape of the train and laser pulse characteristics are measured by a photodiode detector and displayed on a "Tektronix 519" oscilloscope on both 50 and 100 nano second per cm scales are the same within 10% of each other with the average laser pulse duration equal to 10 picoseconds ±2 picoseconds. In conventional Nd laser mode-locked systems the pulse characteristics usually vary over 50%, and have critical mechanical alignment problems which must be within 0.1% as compared with less critical alignment of the presently described embodiment. Also with a thinner cell the dye will not last as long and is critical for longer operating times.

The spacing of elements along the path length 19 is approximately as follows:
- distance between mirror 17 or R = 1.5 m and dye cell 20—20 cm,
- distance between dye cell 20 and aperture plate 21—14 cm,
- distance between aperture plate 21 and laser rod—8 cm,
- laser rod length—22 cm,
- distance between laser rod and output mirror 18—26 cm.

EXAMPLE 2

Both mirrors can have a curved surface meeting the criterion $3L > R > L$.

EXAMPLE 3

A Ruby laser rod is used wih a dye cell thickness of half a cm and located adjacent the curved mirror as shown in the Figure. An aperture of 1 mm is located in the rearward section of the laser cavity. The dye is "DDI" in a methanol base, and performance is similarly stabilized to produce consistent reproducible profile with 25 picosecond laser output pulses. The laser train consists of ten to twelve intense pulses.

It is therefore evident that this invention for the first time provides a combination of elements coacting in an improved and stabilized mode of operation providing improved and consistent pulse characteristics from shot to shot, thereby enabling low cost simplified mode-locked laser pulse systems to be reliably operated for use in scientific analysis of various physical, biological and chemical phenomena. Thus, the laser systems are made reliable enough for production in reproducible form under less critical dimensions and tolerances thereby making mode-locked pulse producing laser systems suitable for sale through commercial channels.

Heretofore because of critical alignment and tolerance conditions which were difficult to maintain and yet did no assure pulses of reproducible characteristics, laser systems could not be marketed with accompanying pulse performance specifications.

EXAMPLE 4

Figure 2:
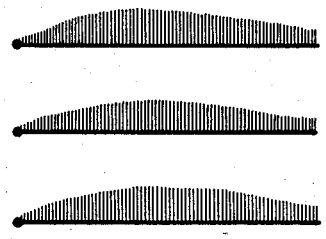
FIGS. 2 through 5 are waveforms obtained by oscilloscope showing the format and stability of the laser pulses produced in accordance with this invention.
Figure 3:
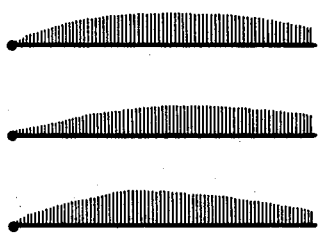
Figure 4:
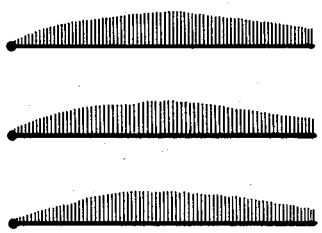
Figure 5:
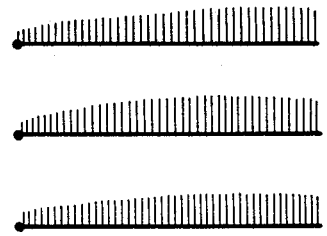

The oscilloscope reproductions of FIGS. 2 to 4 show pulse trains derived from typical shots and detected by photodiode for display on a "519" model "Tektronix" oscilloscope. The pulse duration of the train is measured to be 10±2 picoseconds and the pulse envelope characteristic has a profile, shape and intensity consistent with better than 90% reliability. FIG. 5 shows an expanded sweep.

INDUSTRIAL APPLICATION

A mode-locked pulse laser system using for example Nd:glass laser material is made less critical and more reliable by exclusion of satellite pulse interference in a passive system requiring no active, polarizing or diffraction pattern filters. Thus, with constant output pulse profiles coherent laser energy can be used reliably for scientific analysis of physical, biological and chemical objects and processes.

The critical alignment and operating conditions required by such laser systems in the prior art are removed by the techniques of this invention, which for the first time makes feasible a reliable system adaptable to less strict tolerances required for commercial production.

We claim:

1. A stabilized pulse producing laser system with a mirror having a reflection surface and a specified radius condition, comprising in combination, a laser active material, input trigger pulsing means selectively inducing an envelope pulse of oscillations in said laser material, an optical path of length L passing through said laser material and terminating in two mirrors respectively located on opposite sides of the laser material, at least one said mirror having a radius of curvature R meeting the condition $3L > R > L$ and at least one of said mirrors having a wedge shape so that the reflection surface is disposed at an angle on the order of less than 2°, a dye cell disposed in said path between the two mirrors to produce mode locking presenting a dye thickness in said path in the order of one centimeter, and means for passing laser output pulses through one of said mirrors, whereby the output pulses present similar intensity profiles in response to successive input trigger pulses without critical alignment tolerances.

2. A system as defined in claim 1 wherein said laser material is of Nd glass.

3. A system as defined in claim 1 wherein the length L approximates one meter and the radius R approximates 1.5 meters.

4. A system as defined in claim 1 wherein the dye cell is disposed at Brewster's angle.

5. A system as defined in claim 1 wherein an aperture in the order of less than ten millimeters is located between the laser material and the dye cell.

6. A system as defined in claim 1 wherein said laser material is ruby.

7. A system as defined in claim 6 wherein one said mirror reflects substantially all the laser energy, and said dye cell is positioned adjacent that one said mirror.

8. A system as defined in claim 7 wherein the dye is in methanol.

9. A system as defined in claim 1 wherein the input trigger pulsing means comprises a flash lamp.

10. A system as defined in claim 1 wherein the laser material comprises a rod arranged with faces disposed in said path at Brewster's angle.

11. A system as defined in claim 1 wherein the dye in said 1 cm cell is "Kodak 9860" dye in dichlorethane with a transmission in the order of 70%.

12. A system as defined in claim 1 wherein the one mirror has a reflectance in the order of 99% and surfaces wedge-shaped $\geq 20'$.

13. A system as defined in claim 12 wherein the other mirror has a reflectance of the order of 60%.

14. A system as defined in claim 1 wherein the laser material is Nd glass including means defining an aperture located between the laser material and dye cell presenting an aperture in the order of four millimeters in diameter.

15. A system as defined in claim 14 wherein the Nd glass is doped with silicate, including means maintaining temperature within the order of one degree at 21° C. with circulated cooling water.

16. A system as defined in claim 14 wherein the Nd glass is doped with phosphate, including means maintaining temperature within the order of one degree at 21° C. with a circulated water-ethyl glycol mixture.

17. A system as defined in claim 1 wherein the laser material is Ruby including means defining an aperture located between the laser material and dye cell presenting an aperture in the order of one millimeter.

18. A system as defined in claim 1 including means maintaining temperature within the order of one degree at 21° C. with circulated cooling water.

* * * * *